Dec. 18, 1962  R. L. FISCHER  3,068,943
PROPELLER CONTROL SYSTEM WITH RATE-OF-BLADE-PITCH-CHANGE
FEEDBACK
Filed June 28, 1960
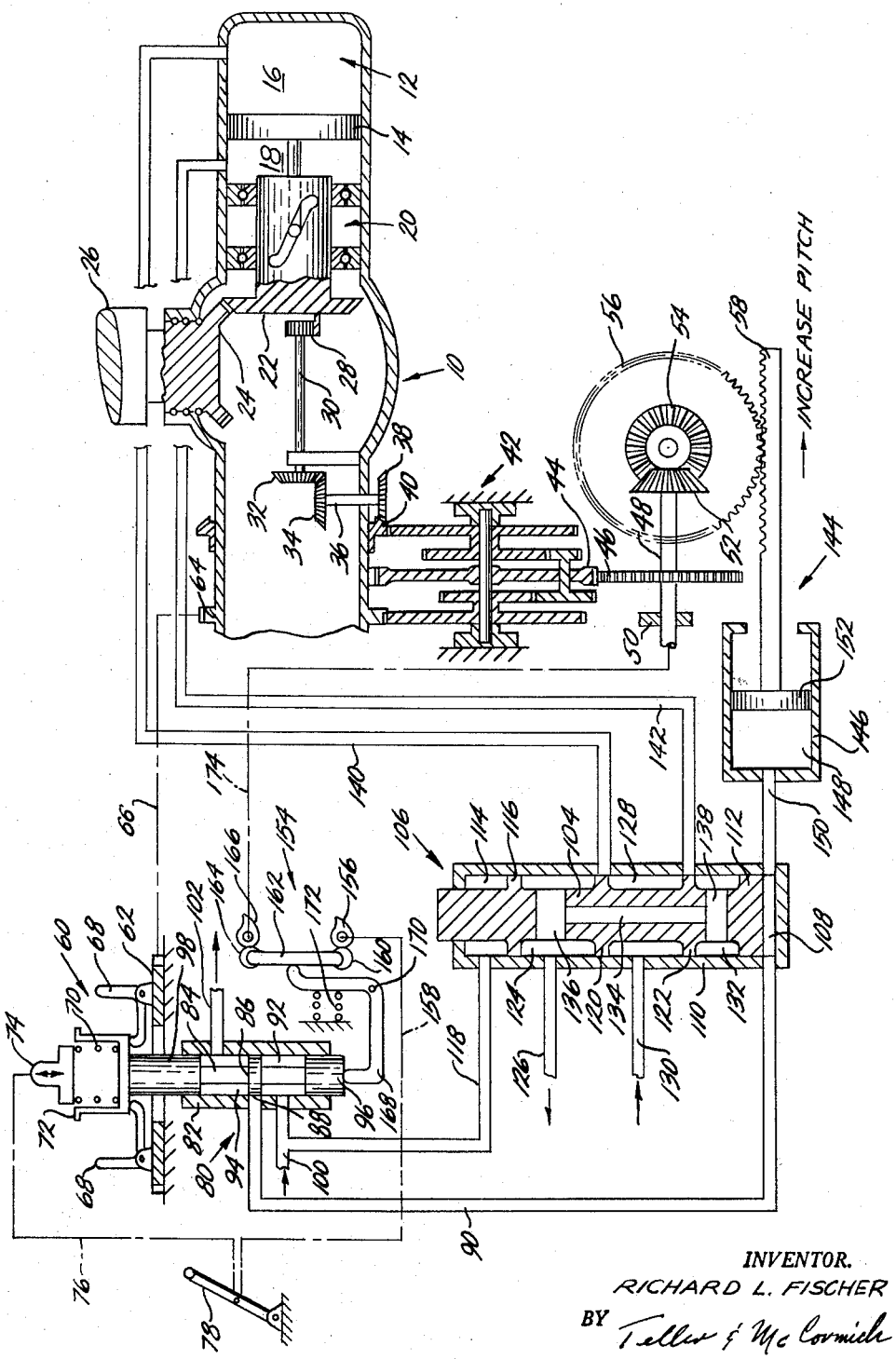
INVENTOR.
RICHARD L. FISCHER
BY Teller & McCormick
ATTORNEYS United States Patent Office 3,068,943
Patented Dec. 18, 1962

3,068,943
PROPELLER CONTROL SYSTEM WITH RATE-OF-BLADE-PITCH-CHANGE FEEDBACK
Richard L. Fischer, Suffield, Conn., assignor to United Aircraft Corporation, East Hartford, Conn., a corporation of Delaware
Filed June 28, 1960, Ser. No. 39,375
10 Claims. (Cl. 170—160.2)

This invention relates to a control system for a variable pitch propeller having an hydraulic pitch changing motor and, more particularly, to a propeller control system of the type which includes a governor operated pilot valve and a distributor valve operable under the control of the pilot valve and which is adapted to selectively meter operating fluid to the propeller pitch changing motor whereby to effect propeller blade pitch changes.

It is the general object of the invention to provide a propeller control system of the type mentioned and which includes a desirably simple and yet highly effective and reliable rate-of-blade-pitch-change negative feedback device for the distributor valve of the system.

The drawing shows a preferred embodiment of the invention and such embodiment will be described, but it will be understood that various changes may be made from the construction disclosed and that the drawing and description are not to be construed as defining or limiting the scope of the invention, the claims forming a part of this specification being relied upon for that purpose.

The single figure of the drawing is a schematic illustration of a variable pitch propeller and a control system therefor embodying the present invention.

A variable pitch propeller of a well-known type indicated generally at 10 includes an hydraulic pitch changing motor indicated generally at 12 and which comprises an hydraulically actuated piston 14, an increase pitch actuating chamber 16, and a decrease pitch actuating chamber 18. The piston 14 is operatively connected with a cam actuating mechanism of conventional type and which is indicated generally at 20. The actuating mechanism 20, in turn, is operatively connected through gears 22 and 24 in a well-known manner with the several propeller blades 26, 26, one shown, so as to effect blade pitch changes in response to movements of the hydraulically operated piston 14.

There is also included in the propeller 10 a gear 28 fixedly mounted on a shaft 30 and driven by the aforesaid gear 22. Also fixedly mounted on the shaft 30 is a bevel gear 32 which drivingly engages a bevel gear 34 on a shaft 36 carrying another bevel gear 38 which drives an initial gear 40 of a differential gear train indicated generally at 42. The differential gearing or gear train 42 may be of any well-known type suitable for transmitting motion from a rotating part to a nonrotating part so that the final gear in the train will move in accordance with the movement of the initial gear in the train relative to its rotating support. Such a gear mechanism is shown and described in detail in the patent to Longfellow et al. 2,664,960 issued January 5, 1954, and in the patent to Richmond 2,666,490 issued January 19, 1954, and reference may be had to these patents for details of construction and operation of the gear train.

A gear 44, which is the final gear in the differential gear train 42, meshes with and drives a gear 46 which may be termed an output member or gear for the gear train and which is fixedly mounted on a shaft 48 supported for rotation at 50. The shaft 48 also carries a bevel gear 52 which is drivingly connected with a bevel gear 54 rotatable with a gear 56. The gear 56 is drivingly connected with a rack 58 which has a function to be described hereinbelow.

From the foregoing, it will be apparent that fluid pressures in the increase and decrease pitch actuating chambers 16 and 18 may be regulated and controlled so as to effect desired propeller blade pitch changing operations through action of the cam actuating mechanism 20 and the gears 22 and 24. When changes in blade pitch are so effected, the gears 28, 32 etc., the differential gear train 42, and the gears 46, 52 etc. provide for movements of the rack 58 which are proportional to the pitch changing movements of the propeller blades in respect to both the rate and the magnitude of such pitch changing movements.

Referring now more particularly to the propeller control system of the present invention, it will be observed that a conventional flyweight type governor is provided as indicated generally at 60. The governor 60 includes a drive gear 62 which is connected with and driven by a gear 64 on the propeller 10 as indicated schematically by the broken line 66. The drive gear 62 carries governor flyweights 68, 68 which are operatively associated with and which act in opposition to a speed set spring 70 in conventional manner. The speed set spring 70 is disposed in a movable cup-shaped seat 72 through which flyweight forces are transmitted to the spring and a spring compression adjusting member is provided and shown schematically at 74. The member 74 is shown as being movable under the direct control of the aircraft pilot by means of a connector indicated at 76 with a control lever 78. Movement of the member 74 adjusting the compression of the spring 70 adjusts the r.p.m. setting of the governor 60 in the conventional manner.

Operatively associated with the governor 60 is a pilot valve indicated generally at 80 and which comprises a housing 82 and a valve member 84 slidably disposed therewithin. The valve member 84 is connected with the aforementioned spring seat 72 and is moved thereby in one and an opposite direction, upwardly and downwardly as shown, in response to propeller overspeed and underspeed conditions respectively. A land 86 on the valve member 84 closes a port 88 in the housing 82 which is connected with a control line or conduit 90 when the propeller is in an onspeed condition, but said land opens said port to valve chambers 92 nad 94 respectively on movement of the valve member in upward and downward directions. The chambers 92 and 94 are defined respectively by the housing 82, the valve land 86, and an annular enlargement 96 and by said housing, said land and an annular enlargement 98. Said chambers 92 and 94 are connected respectively to a source of fluid at a high pressure and a source of fluid at a low or drain pressure by conduits 100 and 102.

From the foregoing, it will be apparent that the pilot valve 80, and, more specifically, the valve land 86 will serve merely to trap fluid in the control conduit 90 when the propeller 10 is operating onspeed. When a propeller overspeed condition occurs as a result of factors extraneous to the control system or adjustment of the speed setting spring 70, however, the valve member 84 will be urged upwardly by the governor flyweights and the spring seat 72. This will cause the valve land 86 to open the port 88 and the control conduit 90 to the valve chamber 92 whereupon high pressure fluid will be metered through said chamber from the conduit 100 and into said control conduit. Conversely, an underspeed condition of the propeller 10 will result in downward movement of the valve member 84, opening of the port 88 and the control conduit 90 to the valve chamber 94 and metering of fluid from said control conduit to the aforementioned drain or low pressure source through the conduit 102. It is to be observed that the extent or degree of movement of the valve member 84 and the land 86 will in all cases be proportional to the magnitude of the propeller speed variation or error. Further, the rate at which fluid is metered through the pilot valve will also be proportional to the magnitude of the speed error.

Fluid metered to and from the control conduit 90 controls movements of a valve member 104 of a distributor valve 106 as will now be described. Said control conduit is connected with an actuating chamber 108 within a housing 110 of the distributor valve 106 and fluid under pressure in said actuating chamber acts on the radial face of an annular enlargement 112 formed at the lower end of the valve member 104. At the upper end of the valve member 104 a biasing chamber 114 is formed within the valve housing 110 and said chamber receives fluid at a reference pressure for action on the annular radial face of a valve land 116 formed on the valve member 104. As shown, a conduit 118 communicates with the biasing chamber 114 and with the aforementioned high pressure conduit 100 for a supply of fluid at a high pressure.

From the foregoing, it will be apparent that fluid may be metered to or from the actuating chamber 108 through the control conduit 90 and the pilot valve 80 to move the valve member 104 in one and an opposite direction or upwardly and downwardly as shown. Fluid in the biasing chamber 114 is at a pressure equal to the highest pressure that may be obtained in the actuating chamber 108, but the effective area of the land 116 is substantially less than the effective area of the annular enlargement 112. Thus, when high pressure fluid is metered to the control conduit 90 and the actuating chamber 108 by the pilot valve 80 in response to an overspeed condition of the propeller 10, the valve member 104 of the distributor valve 106 will be moved in an upward direction. Conversely, an underspeed condition of the propeller and resulting operation of the pilot valve 80 draining fluid from the control conduit 90 will result in movement of the valve member 104 of the distributor valve in a downward direction.

In addition to the valve land 116, the distributor valve member 104 carries a valve land 120 and a valve land 122. The valve land 120 cooperates with the valve land 116 and the valve housing 110 to define a first low or drain pressure chamber 124 which communicates with a conduit 126 connected to a source of fluid at a low or drain pressure. A high pressure chamber 128 defined by and between the valve lands 120 and 122 and by the valve housing 110 communicates with a high pressure conduit 130 connected with a suitable fluid source. The valve land 122 also cooperates with the aforementioned annular enlargement 112 on the valve member 104 and with the valve housing 110 to define a second low or drain pressure chamber 132. Said second low or drain pressure chamber is connected with the first low or drain pressure chamber 124 by means of an axial bore 134 and a pair of communicating transverse bores 136 and 138 in the valve member 104.

The valve land 120 operates to open and close an increase pitch line or conduit 140 connected with the increase pitch actuating chamber 16 in the propeller 10 and said valve land may accordingly be referred to as an increase pitch land. The valve land 122, on the other hand, operates to open and close a decrease pitch line or conduit 142 connected with the decrease pitch actuating chamber 18 in the propeller, and said valve land may accordingly be referred to as a decrease pitch land. More specifically, the increase pitch land 120 opens the increase pitch line 140 to the aforesaid high pressure chamber 128 and the decrease pitch land 122 opens the decrease pitch line 142 to the second drain pressure chamber 132 on movement of the valve member 104 in an upward direction. This obviously results in the supply of high pressure fluid to the increase pitch actuating chamber 16 in the propeller 10 and in draining of fluid from the decrease pitch actuating chamber 18 and the propeller blades 26, 26 are thus moved in an increase pitch direction. Conversely, downward movement of the valve member 104 serves to open the increase pitch line 140 to the first drain pressure chamber 124 and to open the decrease pitch line 142 to the high pressure chamber 128 effecting decrease pitch movement of the propeller blades 26, 26. Note, however, that the valve member 104 is shown in a neutral position and that a crack opening of the increase pitch line 140 to the high pressure chamber 128 is provided for by the increase pitch land 120. A nominal flow of high pressure fluid to the increase pitch actuating chamber 16 is thus provided to compensate for system leakage and to maintain the propeller blades 26, 26 at a desired pitch setting. Relatively small blade pitch change movements in the decrease pitch direction may be effected without actually opening the decrease pitch line 142 to the high pressure chamber 128 to provide an appreciable flow of high pressure fluid to said actuating chamber. That is, a slight downward movement of the valve member 104 will further decrease the nominal flow to the increase pitch actuating chamber 16 and the centrifugal twisting moment of the propeller blades will cause the same to be moved in a decrease pitch direction. Thus, it will be seen that slight movements of the propeller blades in the decrease pitch direction may be accomplished without actually reversing the connection of the pitch lines 140 and 142 with the high and low pressure lines 130 and 126. Larger movements of the blades in the decrease pitch direction, however, require such reversal of the connections of the said lines.

In accordance with the present invention, a rate-of-blade-pitch-change negative feedback device is provided for the distributor valve 106 and said device is indicated generally at 144. In the preferred embodiment shown, the device comprises a housing 146 having a feedback chamber 148 therewithin which communicates with the aforementioned actuating chamber 108 of said distributor valve through a conduit 150. The housing 146 is generally cylindrical as shown and a feedback piston 152 is disposed therewithin for movement in axial directions. The piston 152 is connected with and driven by the aforementioned rack 58 which moves with the propeller blades 26, 26 and at a rate proportional to the rate of pitch changing movement of said blades. Thus, it will be seen that the volume of the feedback chamber 148 in communication with the actuating chamber 108 of the distributor valve will be varied at a rate proportional to the rate of blade pitch change by axial movement of the piston 152.

The feedback device 144 provides for propeller blade pitch changing movements at given or known rates in response to given or known speed variations or errors of the propeller and thus enhances the stability and the overall efficiency of the control system. The manner in which the said feedback device operates should be apparent from the foregoing description and only a brief operational description is required. Operation of the control system including the feedback device is similar in respect to both overspeed and underspeed propeller conditions and therefore only one such condition need be considered. When an overspeed condition of the propeller 10 occurs, the governor flyweights 68, 68 urge the spring seat 72 and the pilot valve member 84 upwardly as described above to meter high pressure fluid to the control conduit 90 and to the distributor valve actuating chamber 108 at a rate proportional to the magnitude of the speed error. Upward movement of the distributor valve member 104 commences and high pressure fluid is metered to the increase pitch actuating chamber 16 of the propeller while fluid is drained from the decrease pitch actuating chamber 18. As increase pitch movement of the propeller blades 26, 26 occurs, the rack 58 moves rightwardly to cause the feedback piston 152 to increase the volume of the feedback chamber 148. When the rate of increase of the volume of the feedback chamber 148 is equal to the rate at which high pressure fluid is metered through the control conduit 90 to the actuating chamber 108 of the distributor valve, upward movement of the distributor valve member 104 will be terminated and the continued movement of the propeller blades in the increase pitch direction will occur at the rate thus established. When the increase pitch movement of the propeller blades results in sufficient reduction of propeller speed to recenter the pilot valve member 84, fluid is trapped in the control conduit 90 and the distributor valve actuating chamber 108 and said distributor valve operates thereafter to maintain the propeller blades at their adjusted pitch setting until a subsequent offspeed condition of the propeller occurs.

Constant speed governor control of aircraft propellers of the type described is unsatisfactory for ground handling operations of aircraft particularly where the propeller is driven by a gas turbine engine. Accordingly, it is a known practice to provide for "beta" or blade pitch control at very low positive blade pitches and in the reverse or negative blade pitch range. That is, governor control of the propeller is overridden and means is provided to enable the aircraft operator to select appropriate blade pitch settings for various phases of ground handling operation of the aircraft. A desirably simple and yet highly effective mechanism is provided for this purpose in the propeller control system of the present invention. Said mechanism is indicated generally at 154 and will be described presently.

The mechanism 154 includes a means operable selectively by the aircraft operator or pilot for overriding or disabling the governor 60 and effecting predetermined displacements of the pilot valve member 84. Said means is shown as comprising a rotary cam 156 having connection with the aforementioned control lever 78 as indicated at 158 and which is operatively associated with a cam roller 160 at one end of a floating link 162. A second cam roller 164 at the opposite end of the link 162 is operatively associated with a second rotary cam 166 which acts in opposition to the cam 156 to recenter the pilot valve member 84 in a manner to be described hereinbelow. A crank arm 168 pivotally supported at 170 has one end thereof held in engagement with the floating link 162 by a biasing spring 172 and the opposite end of said crank arm engages the aforementioned annular enlargement 96 at the lower end of the pilot valve member 84.

It will be apparent that the cam 156 may be rotated by pilot operation of the control lever 78 to displace the pilot valve land 86 in its aforesaid one and opposite directions to effect propeller blade pitch changing movements. The cam 166 is movable with the propeller blades 26, 26 by reason of a connection, indicated generally at 174, with the aforementioned shaft 48 which rotates with and at a rate proportional to the propeller blades during their pitch changing movements. Thus, the aircraft operator or pilot may effect a preselected or predetermined displacement of the pilot valve member 84 to provide for propeller blade pitch changing operation to a preselected or predetermined blade pitch. For example, the pilot may effect counterclockwise rotation of the cam 156 which will result in upward movement of the pilot valve member 84 and increase blade pitch changing operation of the propeller pitch changing motor 12. This will result in clockwise rotation of the feedback cam 166 by the shaft 48 and the pilot valve member 84 will be recentered when the propeller blades reach a preselected or predetermined pitch setting. Conversely, clockwise rotation of the cam 156 will result in movement of the propeller blades in a decrease pitch direction to another preselected or predetermined pitch setting wherein the feedback cam 166 recenters the pilot valve member 84.

The invention claimed is:

1. In a control system for a variable pitch propeller; the combination of an hydraulic blade pitch changing motor, a control conduit, a governor operated pilot valve connected with said control conduit and connectible with high and low fluid pressure sources and adapted to meter fluid to and from said control conduit and from and to said sources respectively in response to propeller offspeed conditions in one and an opposite direction, said governor operated pilot valve being of the proportional type and serving to meter fluid to and from said control conduit at rates proportional to the magnitude of propeller offspeed conditions in said one and opposite directions, a distributor valve having an actuating chamber connected with said control conduit and a valve member movable in one and an opposite direction in response to fluid flow to and from said chamber, said valve being connectible also with high and low fluid pressure sources and with the hydraulic pitch changing motor of the propeller so that movement of its valve member in said one and opposite directions meters fluid to and from said motor to effect propeller blade pitch changes in one and an opposite direction, and a rate-of-pitch change negative feedback device for said distributor valve comprising means defining a feedback chamber communicating with said actuating chamber and also comprising piston means in said feedback chamber connected with said pitch changing motor and movable in said chamber so as to vary the volume thereof in communication with said actuating chamber at a rate proportional to the rate-of-pitch-change of the propeller blades.

2. In a control system for a variable pitch propeller; the combination of an hydraulic blade pitch changing motor, a control conduit, a pilot valve connectible with high and low fluid pressure sources and connected with said control conduit and having a valve member movable in one and an opposite direction, a governor connected with and driven by the propeller and having adjustable speed set means, said governor being operatively connected with said pilot valve member so as to move the same in said one and opposite directions in response to overspeed and underspeed conditions of the propeller whereby to meter fluid to and from said control conduit and from and to said high and low pressure sources respectively, a distributor valve having an actuating chamber connected with said control conduit and a valve member movable in one and an opposite direction in response to fluid flow to and from said chamber, said valve being connectible also with high and low fluid pressure sources and with the hydraulic pitch changing motor of the propeller so that movement of its valve member in said one and opposite directions meters fluid to and from said motor to effect propeller blade pitch changes in one and an opposite direction, and a rate-of-pitch-change negative feedback device for said distributor valve comprising means defining a feedback chamber communicating with said actuating chamber and also comprising piston means in said feedback chamber connected with said pitch changing motor and movable in said chamber so as to vary the volume thereof in communication with said actuating chamber at a rate proportional to the rate-of-pitch-change of the propeller blades.

3. In a control system for a variable pitch propeller; the combination of an hydraulic blade pitch changing motor having increase and decrease pitch actuating chambers, a conduit, a governor operated pilot valve connected with said control conduit and connectible with high and low fluid pressure sources and adapted to meter fluid to and from said control conduit and from and to said sources respectively in response to propeller offspeed conditions in one and an opposite direction, said governor operated pilot valve being of the proportional type and serving to meter fluid to and from said control conduit at rates proportional to the magnitude of propeller offspeed conditions in said one and opposite directions, increase and decrease pitch lines connected respectively with the increase and decrease pitch actuating chambers in the propeller blade pitch changing motor, a distributor valve having an actuating chamber connected with said control conduit and a valve member movable in one and an opposite direction in response to fluid flow to and from said chamber, said valve being connectible also with high and low fluid pressure sources and with said increase and decrease pitch lines so that movement of its valve member in said one and opposite directions alternately connects said pitch change lines with said high and low fluid pressure sources whereby to effect propeller blade pitch changes in opposite directions, and a rate-of-pitch-change negative feedback device for said distributor valve comprising means defining a feedback chamber communicating with said actuating chamber and also comprising piston means in said feedback chamber connected with said pitch changing motor and movable in said chamber so as to vary the volume thereof in communication with said actuating chamber at a rate proportional to the rate-of-pitch-change of said propeller blades.

4. In a control system for a variable pitch propeller; the combination of an hydraulic blade pitch changing motor, a control conduit, a governor operated pilot valve connected with said control conduit and connectible with high and low fluid pressure sources and adapted to meter fluid to and from said control conduit and from and to said sources respectively in response to propeller offspeed conditions in one and an opposite direction, said governor operated pilot valve being of the proportional type and serving to meter fluid to and from said control conduit at rates proportional to the magnitude of propeller offspeed conditions in said one and opposite directions, a distributor valve having a valve member movable in one and an opposite direction and also having actuating and biasing chambers at opposite ends of said member, said actuating chamber being connected with said control conduit and said biasing chamber being connected with a source of fluid at a reference pressure, and said distributor valve being connectible also with high and low fluid pressure sources and with the hydraulic pitch changing motor of the propeller so that movement of its valve member in said one and opposite directions meters fluid to and from said motor to effect propeller blade pitch changes in one and an opposite direction, and a rate-of-pitch-change negative feedback device for said distributor valve comprising means defining a feedback chamber communicating with said actuating chamber and also comprising piston means in said feedback chamber connected with said pitch changing motor and movable in said chamber so as to vary the volume thereof in communication with said actuating chamber at a rate proportional to the rate-of-pitch-change of said blades.

5. In a control system for a variable pitch propeller; the combination of an hydraulic blade pitch changing motor having increase and decrease pitch actuating chambers, a control conduit, a pilot valve connectible with high and low fluid pressure sources and connected with said control conduit and having a valve member movable in one and an opposite direction, a governor connected with and driven by the propeller and having adjustable speed set means, said governor being operatively connected with said pilot valve member so as to move the same in said one and opposite directions in response to overspeed and underspeed conditions of the propeller whereby to meter fluid to and from said control conduit and from and to said high and low pressure sources respectively and at rates proportional to the magnitude of the propeller speed error, increase and decrease pitch lines connected respectively with the increase and decrease pitch actuating chambers in the propeller blade pitch changing motor, a distributor valve having an actuating chamber connected with said control conduit and a valve member movable in one and an opposite direction in response to changes in fluid pressure in said chamber, said valve being connectible also with high and low fluid pressure sources and with said increase and decrease pitch lines so that movement of its valve member in said one and opposite directions alternately connects said pitch change lines with high and low fluid pressure sources whereby to effect propeller blade pitch changes in opposite directions, and a rate-of-pitch-change negative feedback device for said distributor valve comprising means defining a generally cylindrical feedback chamber communicating with said actuating chamber and also comprising piston means in said feedback chamber connected with said pitch changing motor and movable in said chamber at a rate proportional to the rate-of-pitch-change of the propeller blades.

6. In a control system for a variable pitch propeller; the combination of an hydraulic blade pitch changing motor, a control conduit, a pilot valve connectible with high and low fluid pressure sources and connected with said control conduit and having a valve member movable in one and an opposite direction, a governor connected with and driven by the propeller and having adjustable speed set means, said governor being operatively connected with said pilot valve member so as to move the same in said one and opposite directions in response to overspeed and underspeed conditions of the propeller whereby to meter fluid to and from said control conduit and from and to said high and low pressure sources respectively, said governor being of the proportional type and serving to move said pilot valve so that fluid is metered to and from said control conduit at rates proportional to the magnitude of propeller offspeed conditions in said one and opposite directions, a distributor valve having an actuating chamber connected with said control conduit and a valve member movable in one and an opposite direction in response to changes in fluid pressure in said chamber, said valve being connectible also with high and low fluid pressure sources and with the hydraulic pitch changing motor of the propeller so that movement of its valve member in said one and opposite directions meters fluid to and from said motor to effect propeller blade pitch changes in one and an opposite direction, a rate-of-pitch-change negative feedback device for said distributor valve comprising means defining a feedback chamber communicating with said actuating chamber and also comprising piston means in said feedback chamber connected with said pitch changing motor and movable in said chamber so as to vary the volume thereof in communication with said actuating chamber at a rate proportional to the rate-of-pitch-change of said blades, selectively operable means for overriding said governor and effecting predetermined displacements of said pilot valve member in said one and opposite directions whereby to meter fluid from and to said high and low pressure sources through said control conduit and actuating chamber and to thereby increase and decrease propeller blade pitch, and a second feedback device comprising a negative position feedback connected with said pilot valve member and with said pitch changing motor and operable to recenter said valve member in response to predetermined blade pitch changes.

7. The combination in a propeller control system as set forth in claim 6 wherein said selectively operable means includes pilot actuated cam means operatively connected with said pilot valve member and wherein said second feedback device includes a second cam means operable in opposition to said pilot actuated cam means.

8. In a control system for a variable pitch propeller; the combination of an hydraulic blade pitch changing motor, differential gearing with an output member movable with and at a rate proportional to the rate-of-pitch-change of the propeller blades, a control conduit, a pilot valve connectible with high and low fluid pressure sources and connected with said control conduit and having a valve member movable in one and an opposite direction, a governor connected with and driven by the propeller and having adjustable speed set means, said governor being operatively connected with said pilot valve member so as to move the same in said one and opposite directions in response to overspeed and underspeed conditions of the propeller whereby to meter fluid to and from said control conduit and from and to said high and low pressure sources respectively, said governor being of the proportional type and serving to move said pilot valve so that fluid is metered to and from said control conduit at rates proportional to the magnitude of propeller offspeed conditions in said one and opposite directions, a distributor valve having an actuating chamber connected with said control conduit and a valve member movable in one and an opposite direction in response to fluid flow to and from said chamber, said valve being connectible also with high and low fluid pressure sources and with the hydraulic pitch changing motor of the propeller so that movement of its valve member in said one and opposite directions meters fluid to and from said motor to effect propeller blade pitch changes in one and an opposite direction, a rate-of-pitch-change negative feedback device for said distributor valve comprising means defining a feedback chamber communicating with said actuating chamber and also comprising piston means in said feedback chamber connected with said output member of said differential gearing and movable in said chamber so as to vary the volume thereof in communication with said actuating chamber at a rate proportional to the rate-of-pitch-change of the propeller blades, selectively operable means including pilot actuated cam means connected with said pilot valve member for overriding said governor and effecting predetermined displacements of said valve member in said one and opposite directions whereby to meter fluid between said high and low pressure sources and said control conduit and actuating chamber and to thereby increase and decrease propeller blade pitch, and a second feedback device comprising a negative position feedback including second cam means connected with said pilot valve member and with the output member of the differential gearing and operable in opposition to said pilot actuated cam means to recenter said pilot valve member in response to predetermined blade pitch changes.

9. In a control system for a variable pitch propeller; the combination of an hydraulic blade pitch changing motor having increase and decrease pitch actuating chambers, a control conduit, a pilot valve connectible with high and low fluid pressure sources and connected with said control conduit and having a valve member movable in one and an opposite direction, a governor connected with and driven by the propeller and having adjustable speed set means, said governor being operatively connected with said pilot valve member so as to move the same in said one and opposite directions in response to overspeed and underspeed conditions of the propeller whereby to meter fluid to and from said control conduit and from and to said high and low pressure sources respectively and at rates proportional to the magnitude of the propeller speed error, increase and decrease pitch lines connected respectively with the increase and decrease pitch actuating chambers in the propeller blade pitch changing motor, a distributor valve having an actuating chamber connected with said control conduit and a valve member movable in one and an opposite direction in response to changes in fluid pressure in said chamber, said valve being connectible also with high and low fluid pressure sources and with said increase and decrease pitch lines so that movement of its valve member in said one and opposite directions alternately connects said pitch change lines with high and low fluid pressure sources whereby to effect propeller blade pitch changes in opposite directions, a rate-of-pitch-change negative feedback device for said distributor valve comprising means defining a generally cylindrical feedback chamber communicating with said actuating chamber and also comprising piston means in said feedback chamber connected with said pitch changing motor and movable in said chamber at a rate proportional to the rate-of-pitch-change of the propeller blades, selectively operable means for overriding said governor and effecting predetermined displacements of said pilot valve member in said one and opposite directions whereby to increase and decrease propeller blade pitch, and a second feedback device comprising a negative position feedback connected with said pilot valve member and said pitch changing motor and operable to recenter said valve member in response to predetermined blade pitch changes.

10. In a control system for a variable pitch propeller; the combination of an hydraulic blade pitch changing motor having increase and decrease pitch actuating chambers, differential gearing with an output member movable with and at a rate proportional to the rate-of-pitch-change of the propeller blades, a control conduit, a pilot valve connectible with high and low fluid pressure sources and connected with said control conduit and having a valve member movable in one and an opposite direction, a governor connected with and driven by the propeller and having adjustable speed set means, said governor being operatively connected with said pilot valve member so as to move the same in said one and opposite directions in response to overspeed and underspeed conditions of the propeller whereby to meter fluid to and from said control conduit and from and to said high and low pressure sources respectively and at rates proportional to the magnitude of the propeller speed error, increase and decrease pitch lines connected respectively with the increase and decrease pitch actuating chambers in the propeller blade pitch changing motor, a distributor valve having an actuating chamber connected with said control conduit and a valve member movable in one and an opposite direction in response to fluid flow to and from said chamber, said valve being connectible also with high and low fluid pressure sources and with said increase and decrease pitch lines so that movement of its valve member in said one and opposite directions alternately connects said pitch change lines with high and low fluid pressure sources whereby to effect propeller blade pitch changes in opposite directions, a rate-of-pitch-change negative feedback device for said distributor valve comprising means defining a feedback chamber communicating with said actuating chamber and also comprising piston means in said feedback chamber connected with said output member of said differential gearing and movable in said chamber so as to vary the volume thereof in communication with said actuating chamber at a rate proportional to the rate-of-pitch-change of said blades, selectively operable means including pilot actuated cam means connected with said pilot valve member for overriding said governor and effecting predetermined displacements of said valve member in said one and opposite directions whereby to increase and decrease propeller blade pitch, and a second feedback device comprising a negative position feedback including second cam means connected with said pilot valve member and with the output member of the differential gearing and operable in opposition to said pilot actuated cam means to recenter said pilot valve member in response to predetermined blade pitch changes.

References Cited in the file of this patent

UNITED STATES PATENTS

| | | |
|---|---|---|
| 752,491 | Warren | Feb. 16, 1904 |
| 2,756,012 | Moore et al. | July 24, 1956 |
| 2,781,856 | Danvers et al. | Feb. 19, 1957 |
| 2,849,072 | Brahm | Aug. 26, 1958 |
| 2,971,585 | Whittle et al. | Feb. 14, 1961 |